United States Patent [19]

Pettersson

[11] Patent Number: 5,242,186
[45] Date of Patent: Sep. 7, 1993

[54] COUPLING DEVICE FOR A MOTOR VEHICLE

[75] Inventor: Tommy Pettersson, Grästorp, Sweden

[73] Assignee: VBG Produkter AB, Vanersborg, Sweden

[21] Appl. No.: 721,569

[22] PCT Filed: Jan. 24, 1990

[86] PCT No.: PCT/SE90/00054

§ 371 Date: Jul. 24, 1991

§ 102(e) Date: Jul. 24, 1991

[87] PCT Pub. No.: WO90/08664

PCT Pub. Date: Aug. 9, 1990

[30] Foreign Application Priority Data

Feb. 1, 1989 [SE] Sweden .............................. 8900350-3
May 17, 1989 [SE] Sweden .............................. 8901762-8
Jun. 28, 1989 [SE] Sweden .............................. 8902334-5

[51] Int. Cl.⁵ .............................................. B60D 1/52
[52] U.S. Cl. .................................. 280/511; 280/491.5; 403/317
[58] Field of Search .................. 280/511, 491.5, 477, 280/504, 491.3, 512, 513; 403/317

[56] References Cited

U.S. PATENT DOCUMENTS

| | | | |
|---|---|---|---|
| 4,388,012 | 6/1983 | Erickson | 280/511 X |
| 4,613,149 | 9/1986 | Williams, Jr. | 280/511 X |
| 5,000,474 | 3/1991 | Kristensen | 280/511 X |

FOREIGN PATENT DOCUMENTS

0151099 8/1985 European Pat. Off. .
0160934 11/1985 European Pat. Off. .
2723073 1/1988 Fed. Rep. of Germany .

Primary Examiner—Margaret A. Focarino
Assistant Examiner—C. Mattix
Attorney, Agent, or Firm—Oblon, Spivak, McClelland, Maier & Neustadt

[57] ABSTRACT

A coupling device intended to be applied on a vehicle, and which includes an attachment portion and a coupling portion, one of said portions including a tube shaped female element and the other one a longitudinal male element intended to be received in the female element. A movable piston, sidewardly spring biased towards the female element, is able to be introduced a side recess in the male element, the piston being kept pressed into the side recess by an abutment element in a first mutual position of engagement between the piston and the abutment element. The abutment element, being sidewardly engaging into the path of movement of the piston, is arranged so as to be able to be brought essentially in the longitudinal direction of the piston while bringing the piston to a mutual second position of engagement between the abutment element and the piston, in which the abutment element keeps the piston caught, against the action of the spring bias, essentially outside the path of movement of the male element in the female element.

5 Claims, 4 Drawing Sheets

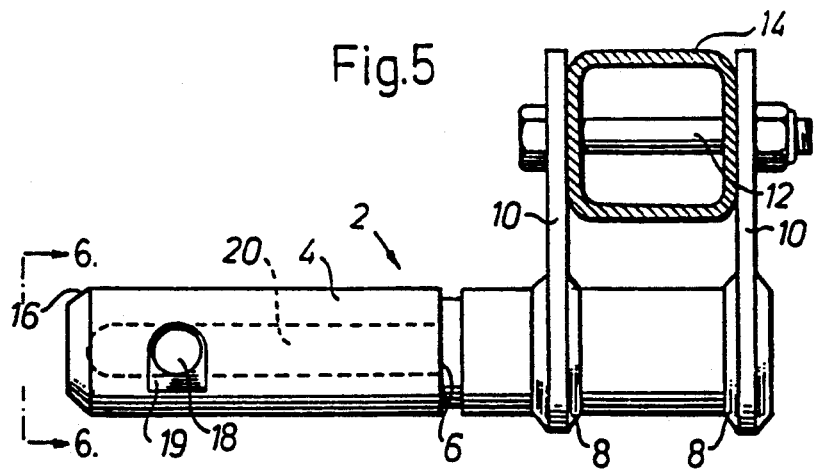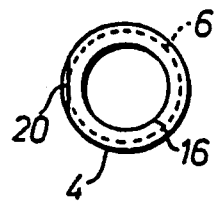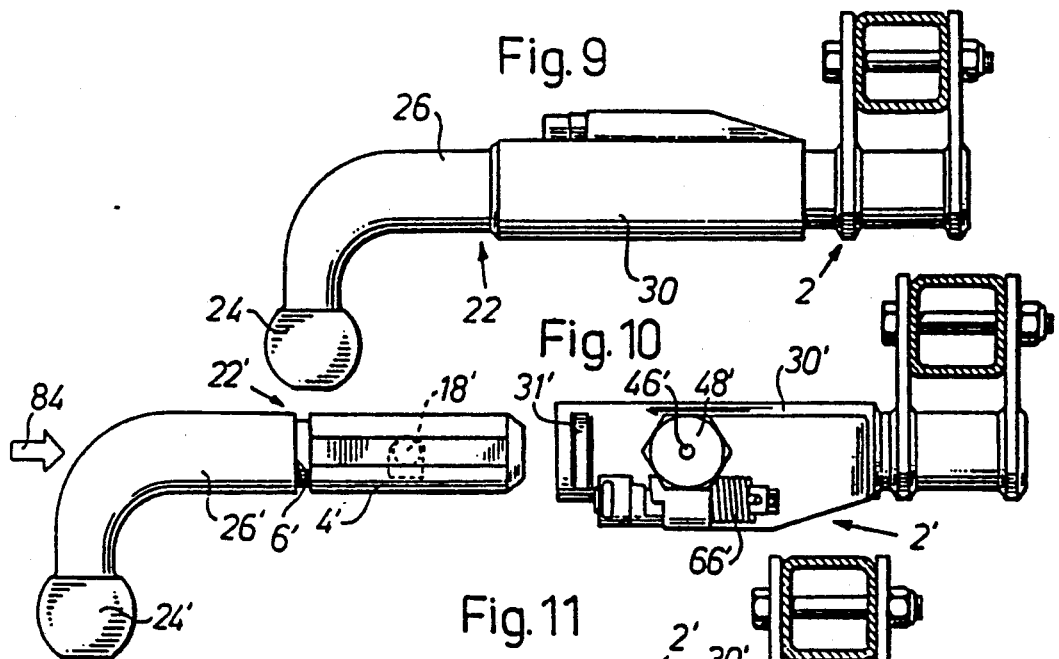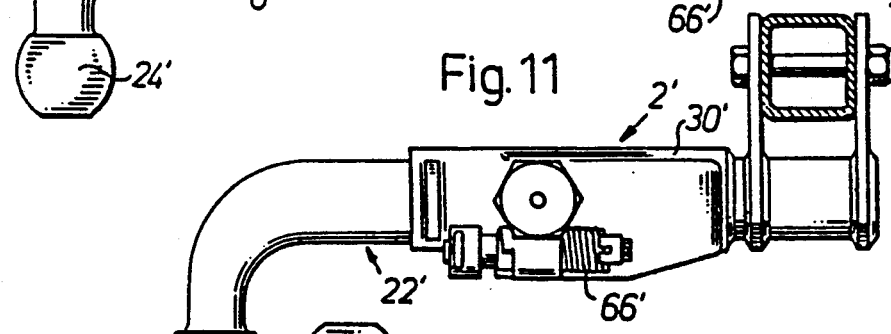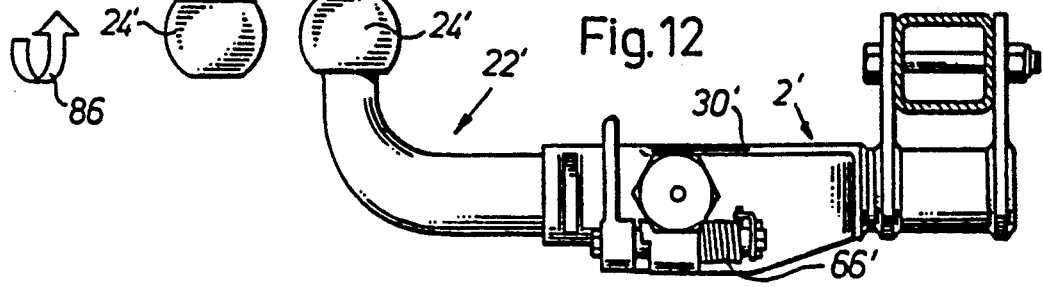

COUPLING DEVICE FOR A MOTOR VEHICLE

BACKGROUND OF THE INVENTION

1. Field of the Invention

The present invention relates to a coupling device according to the preamble of claim 1.

The coupling device according to the invention is preferably intended to be used for coupling a trailer or similar structure to a motor vehicle, such as a passenger car.

2. Discussion of the Background

Through Swedish patent specification 8400369-8 a coupling device of the kind stated by way of introduction is known. This known coupling device has turned out to be safe and reliable in practice. Another similar coupling device is known through EP 0160934.

The object of the present invention is to improve and simplify a coupling device of the kind stated by way of introduction.

SUMMARY OF THE INVENTION

This object has been attained in that the coupling device according to the invention has obtained the features stated in claim 1.

The invention will now be described more closely below with reference to the attached drawings, in which

BRIEF DESCRIPTION OF THE DRAWINGS

FIG. 5 is a side view showing an attachment portion associated with the coupling portion according to FIGS. 1-4, FIG. 6 shows the attachment portion according to FIG. 5 in the direction of arrows VI—VI in FIG. 5, FIGS. 7a-e show sectional views taken in the direction of arrows VII—VII in FIG. 2 and illustrate succesive steps in disconnecting the coupling portion according to FIGS. 1-4 as well as the attachment portion according to FIGS. 5, 6, FIGS. 7e-i show similar sectional view which illustrate succesive steps in connecting together the same coupling portion and attachment portion, FIG. 9 is a side view showing the mutual position of the coupling portion and the attachment portion in connection with the transfer steps from FIG. 7d to 7e or the transfer steps from FIG. 7g to 7h, and FIGS. 10-12 shows side views illustrating three succesive steps in connecting the coupling portion to the attachment portion in a second embodiment of the coupling device according to the invention.

DESCRIPTION OF THE PREFERRED EMBODIMENTS

Figure 1:
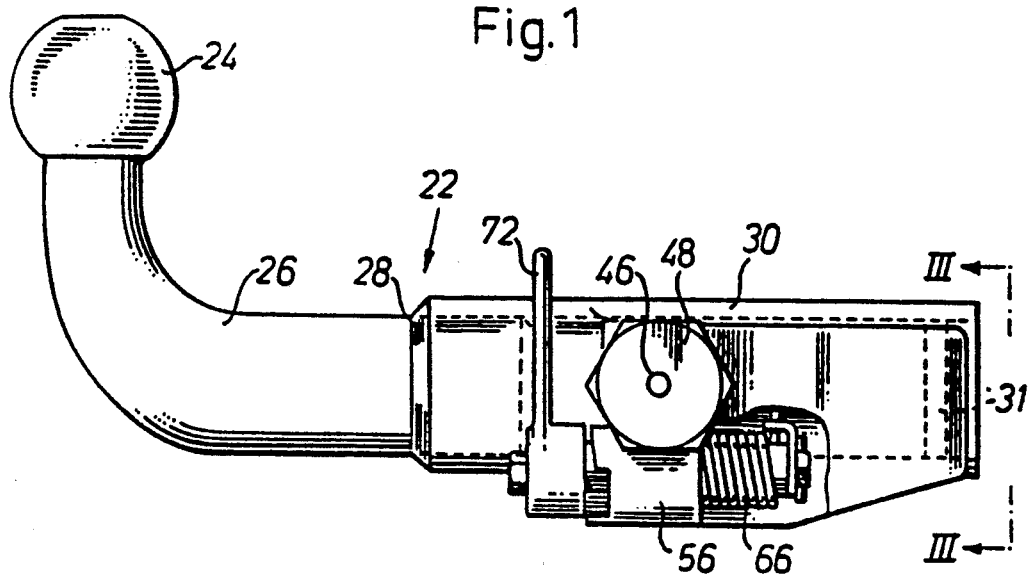
FIG. 1 in a side view shows the coupling portion of a first embodiment of the coupling device according to the invention.
Figure 2:
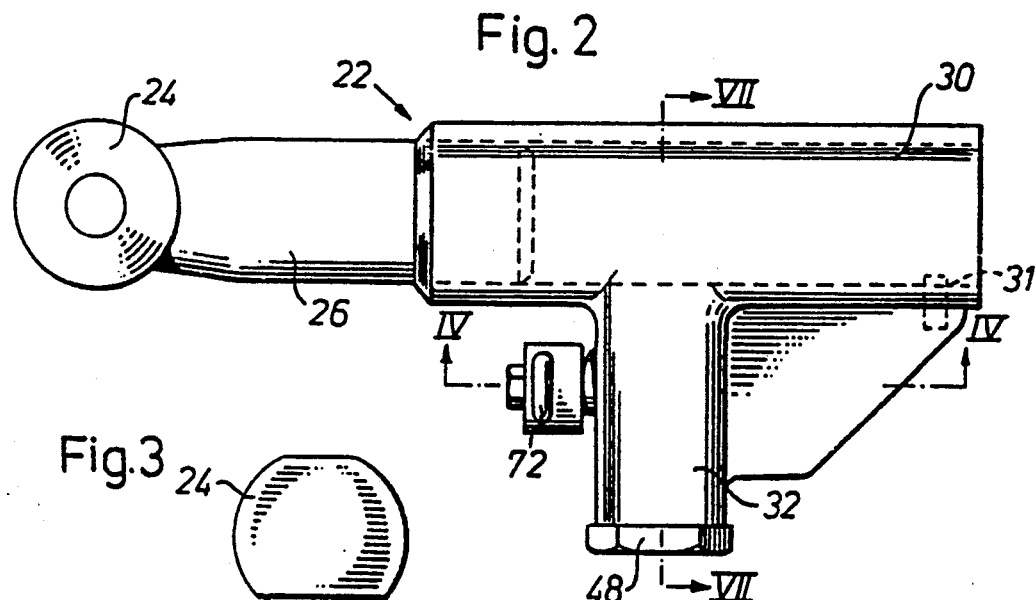
FIG. 2 shows the coupling portion according to FIG. 1 in a view from above.
Figure 3:
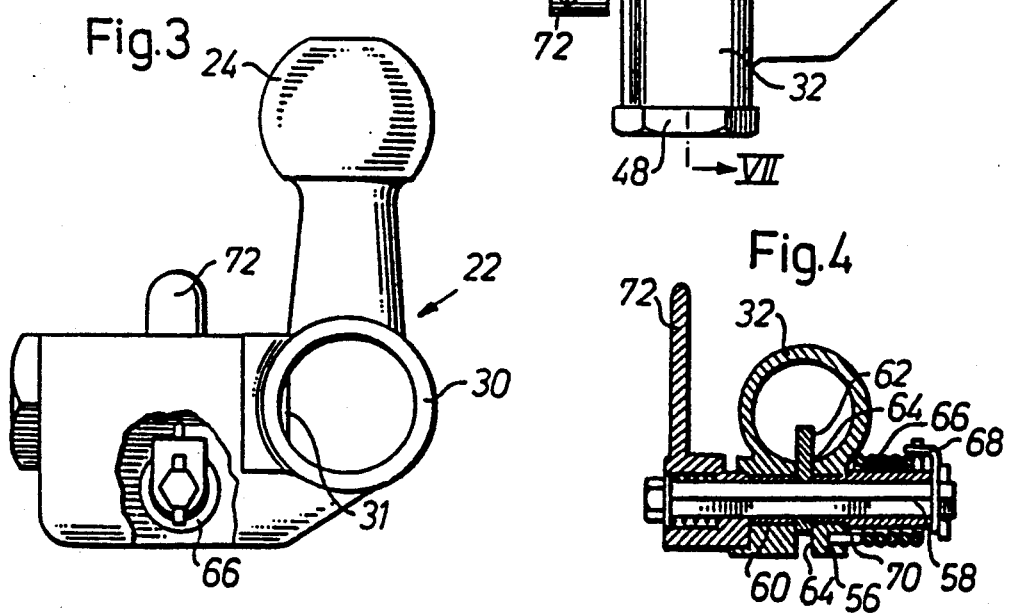
FIG. 3 shows the coupling portion according to FIGS. 1 and 2 in an end view in the direction of arrows III—III in FIG. 1.
Figure 4:
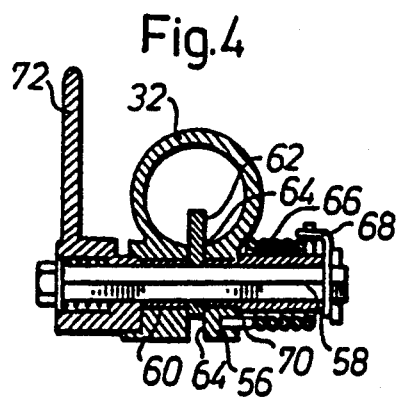
FIG. 4 shows a sectional view through the same coupling portion in the direction of arrows IV—IV in FIG. 2.

The embodiment of the coupling device according to the invention shown in FIGS. 1-9 includes an attachment portion generally designated by reference number 2. The attachment portion 2 consists of a round bar 4 around the periphery of which a groove 6 extends at a distance, more closely defined below, from the left hand end in FIG. 5. To the right of the groove 6 in FIG. 5 it is illustrated how the round bar 4 by means of welds, indicated by reference number 8, carries mounting plates 10, by means of which the attachment portion 2 is attached by means of bolts, of which one is indicated at 12, to a rear vehicle beam, indicated in section by reference number 14. Elements 8-14 only serve as examples of illustration of how the attachment portion 2 can be attached to a vehicle, and are of course adapted to the type and kind of the vehicle.

The left hand end of the bar 4 in FIG. 5 is bevelled at 16. On one of its sides the bar 4 at a distance from the groove 6, discussed in greater detail below, has a hole 18, the shape and depth of which appears from some of the views in FIG. 7. A bevel 19 connects to the mouth of the hole 18, as shown in FIGS. 5 and 7c. On the diametrically opposite side the bar 4 has a plane bevel 20 extending between the bevel 16 and the groove 6 and has the same depth as the latter.

The coupling device according to the first embodiment also includes a coupling portion generally designated 22. At one of its ends the coupling portion 22 has a coupling ball 24 of a conventional kind which, likewise conventionally, is located on the end of a round bar 26. The round bar 26 is attached, indicated by a weld 28, into the end of a tube 30 intended for receiving the bar 4 when the portions 2 and 22 are to be connected together. At the same distance from the center of the tube 32 as the center of the hole 18 is located from the groove 6 in the bar 4, the tube 30 includes an inwardly protruding shoulder 31. More particularly, the shoulder 31 is located at a position in the tube 30 located closest to the tube 32 and has a depth of penetration corresponding to the depth of the bevel 20 in the bar 4 and a thickness corresponding to the width of the groove 6.

An additional tube 32 is attached perpendicularly to the side of the tube 30 and opens into the inner portion of the tube 30 via said side. Referring particularly to FIG. 8, the tube 32 serves for guiding a piston 24. The piston 34 has a piston head 35 with a shape complementary to the shape of the hole 18 in the bar 4. More particularly this shape consists of a short essentially cylindrical end portion 36 and a portion 38 in the form of a frustrum of a cone connecting thereto. The hole 18 has portions corresponding to the portions 36 and 38, the inner cylindrical portion of the hole then being somewhat longer than the corresponding portion 36 of the piston head 34, so that when the piston head 35 is introduced into the hole 18 in a way to be described in greater detail below, the respective portions in the form of frustrums of cones come into engagement with each other. The outer diameter of the bar 4 and the inner diameter of the tube 30 are so adapted to each other that the bar 4, of a reason to be described more closely below, fits with some play in the tube 30 as indicated by reference number 39 in FIGS. 7a and 7i, but omitted in the rest of the sub-Figures of FIG. 7 for the sake of simplicity.

The pistons 34 furthermore in connection with the piston head 35 has a piston slide 40 slidably fitted with a slide fit in the bore of the tube 32. The piston slide on its side remote from the piston head 35 has an edge bevel 42 with a function to be described more closely below. At a distance from the piston slide 40 the piston 34 has a further piston slide 44 likewise fitting with slide fit in the bore of the tube 32. To the piston slide 44 a central piston rod 46 connects. The bore of the tube 32 is closed at the end by means of an end lid 48 of which a cylindrical portion 50 is screwed into the end of the tube 32. The lid 48 has a central through hole 52 adapted to the piston rod 46. In the position of the piston 34 shown in FIG. 8 with the piston head 35 in engagement with the hole 18 the other end of the piston rod 46 lies essentially in plane with the outside of the lid 48, as shown in FIG. 8. By means of a screw spring 54 the piston 34 is biased towards the rod 4. More particularly the screw spring 54 is located around the piston rod 46 acting between the piston slide 44 and the lid 48 in the way shown in FIG. 8.

The tube 32 on its underside carries a bearing housing 56 for a shaft 58 having a hexagonal section and extending transversly to the tube 32. More particularly, the shaft 58 is non-rotatably enclosed in a bearing sleeve 60 by means of which the shaft 58 is rotatably journalled in the bearing housing 56. The hexagonal shaft 58 in the diametrical plane of the tube 32 non-rotatably carries a plate shaped abutment element 62 extending into the tube 32 between the piston slides 40 and 44. More particularly this plate shaped abutment element 62 is located in a longitudinally extending slot 64 in the wall of the tube 32 and that also extends down through the bearing housing 56.

The shaft 58 by means of a torsion spring 66, surrounding the same, is biased counter-clockwise in the sectional views shown in FIGS. 7 and 8. More particularly, the spring 66 acts in the manner indicated in FIGS. 1 and 4 between one of the ends of the shaft 58 at 68 and the bearing housing 56 at 70. On its other end the shaft 58 carries a handle 72 by means of which the shaft 58 can be rotated against the action of the spring 66.

As appears from FIGS. 7 and 8 the abutment element 62 in section is constructed roughly as an arm extending from the shaft 58. The end remote from the shaft 58 of this arm has a portion 74, curved in a side view, intended for cooperation with the bevel 42 of the piston slide 40 in a way to be described more closely below in the position shown in FIGS. 7a, 7i and 8. The curved portion 74 extends between a nose 76 and a notch 78. The function of the last mentioned elements will appear more closely below from the description of the interconnection and disconnection, respectively, of the portions of the coupling device.

Figure 7A:
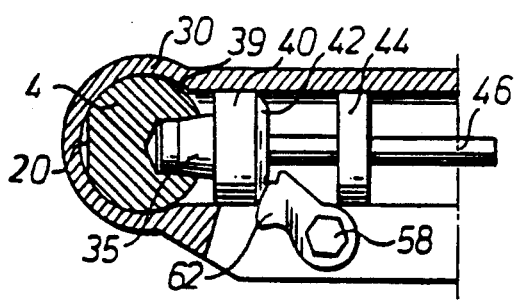

In FIG. 7a the coupling portion and the attachment portion 2 are shown in an interconnected situation. The piston head 35 penetrates into the hole 18 of the bar 4 and by means of the above mentioned play 39 between the bar 4 and the inside of the tube 32 the bar 4 is pressed into contact, free of play, against the inside of the tube facing the piston 34, by engagement between the curved portion 74 of the abutment element 62 and the bevel 42 on the piston slide 40. More particularly, the engagement between the curved portion 74 and the bevel 42 is wedgelike, which is due to the fact that the radius of the curved shape 74 does not extend through the center of the shaft 58, but above this in FIG. 7a. Disengagement of the coupling portion 22 from the attachment portion 2 begins with rotation of the handle 72, and thereby the shaft 58 and the abutment element 62, against the action of the torsion spring 66, the piston 34 then, when the abutment element 62 has reached the position shown in FIG. 7b, being also moved by engagement of the abutment element 62 against the piston slide 44. Finally the position shown in FIG. 7c is reached, where the edge of the piston slide 44 has been received in the notch 78 in the abutment element 62. The shape of the notch 78 is then such with respect to the edge of the piston slide 44 that the position shown in FIG. 7c implies a mutual catching of the piston 34 and the abutment element 62 under the action of the respective springs 54 and 66. The length of the piston head 35 is so dimensioned that in the same position the end of the piston head extends somewhat into the hole 18 into alignment with the bevel 19.

Figure 7B:
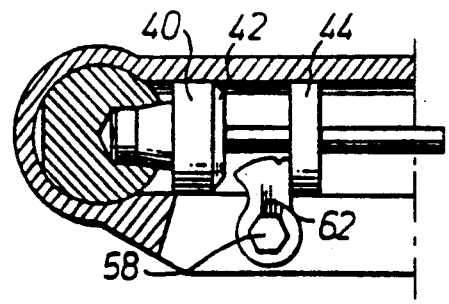
Figure 7C:
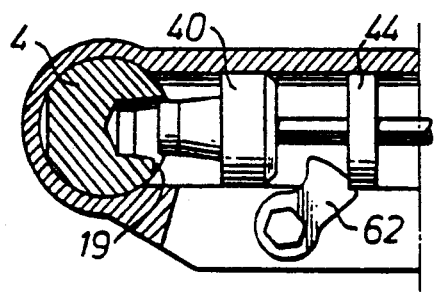
Figure 8:
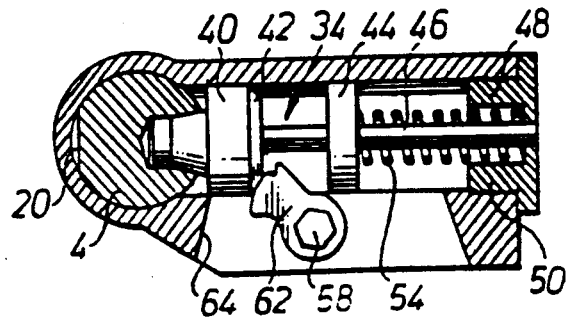
FIG. 8 shows a similar sectional view as in FIG. 7 but more in detail and shows the associated parts when the coupling device takes the same coupling position as in FIGS. 7a and 7i.

As shown, in the position shown in FIGS. 7a-c, the bevel 20 on the bar 4 is furthermore located opposite to the shoulder 31 in the inside of the tube 30, implying that the shoulder 31 engages into the groove 6 in the bar 20 and thereby blocks the bar 20 against longitudinal movement. If now the ball portion 24, 26 by the coupling portion is rotated clockwise, the piston head 35 via the bevel 18 reaches up onto the periphery of the bar 4 which, however, implies further shifting of the piston 34 in the direction from the bar 4 due to the fact that, as mentioned above, in the position 7c the piston head 35 extends somewhat into the hole 18. This further longitudinal shifting of the piston 34 is enough to release the engagement between the notch 78 of the abutment element 62 and the edge of the piston slide 44, implying that the abutment element 62 under the action of the torsion spring 66 rotates counter clockwise so that the nose 76 on the abutment element 62 engages the backside of the piston slide 40.

Figure 7D:
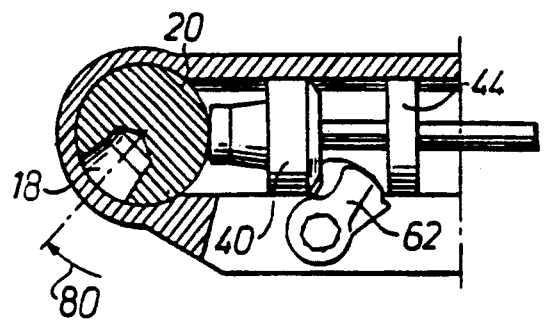
Figure 7E:
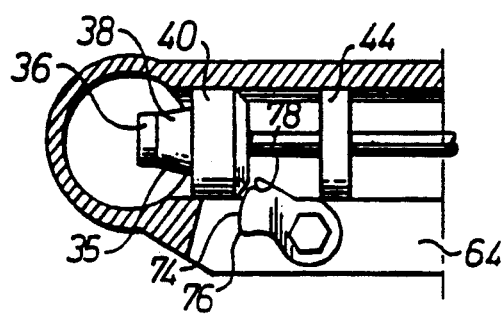
Figure 7F:
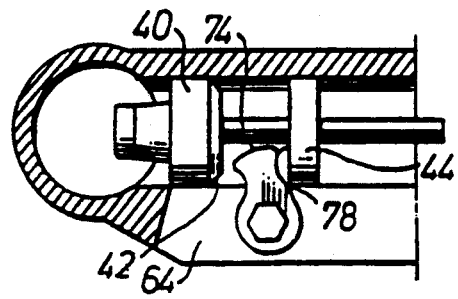

When the bar 20, by the rotational movement indicated in FIG. 7d by the arrow 80, has reached a position in which the hole 18 is located diametrically opposite to that in FIGS. 7a-c, the bevel 20 of the bar 4 at the same time has reached the same side in the tube 30 as the abutment element 31. This implies that the coupling portion, 22 without being obstructed by the groove 6 in the bar 4, is drawn from the bar 4. This mutual rotational position of the coupling portion 22 and the attachment element 2 is shown in FIG. 9, it being noted that the ball 24 points downwardly. When the coupling portion 22 is entirely free also the piston 34 is free to move under the action of its biasing spring 54 in the inner of the tube 30. This position is shown in FIG. 7e, it being then noted that the abutment 62, although not being in engagament with the piston slide, blocks movement of the piston 34 to the right in FIG. 7e. Both elements 34 and 62 are then biased to the position shown by their respective biasing springs. The handle 72 takes the upwardly pointing position shown in FIGS. 1-4.

Figure 7G:
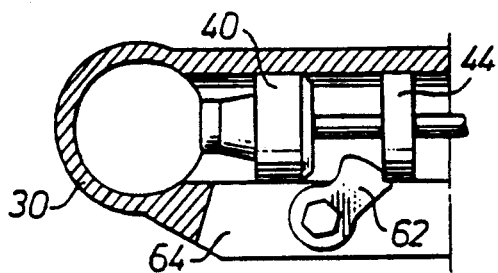
Figure 7H:
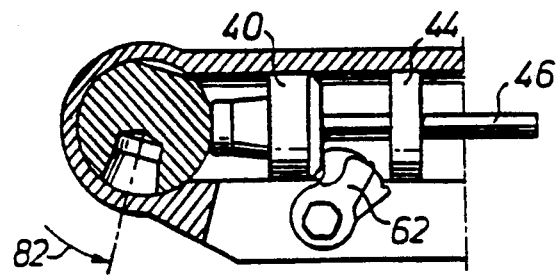

FIG. 7e can also serve as a starting point for describing the interconnecting steps for the portions 22 and 2. By turning the handle 72 the piston 34 will be moved from the position shown in FIG. 7f by engagement between the abutment element 62 and the piston slide 44 until mutual catching of the piston 34 and the abutment element 62 in the way shown in FIG. 7g is attained. With the ball portion 24 pointing downwards as in FIG. 9 the coupling portion 22 is now brought onto the bar 4, the end bevel 16 on the bar 4 then initially comming into engagement with the end of the piston head 35 and guiding the latter up onto the periphery of the bar 4, implying that the piston 34 simultanously is subjected to a small overtravel to the right, which is enough to release the engagement between the abutment element 62 and the piston slide 44, as indicated in FIG. 7h. With the bar 4 now introduced so far into the tube 30 that the hole 18 and the center of the tube 32 are in the same plane, the coupling portion 22 is now rotated from the position shown in FIG. 9 to the postion shown in FIG. 1, in which the hole 18 has been brought just in front of the piston head 35 and thereby the locked position of engagement shown in FIG. 7i between the two portions 2 and 22 has been obtained, said position of engagement being the same as in FIG. 7a and FIG. 8.

It should be noted that this locked position has a visible indication in that the end of the piston rod 46 lies essentially in plane with the outside of the lid 48. In all other positions of the piston 34 the end of the piston rod 46 protrudes out through the lid 48.

It should furthermore be noted that in the mutual interconnecting position of the portions 2 and 22, a threefold security against unintentional release of the joint exists, viz. through the engagement of the abutment element 31 in the groove 6, the engagement of the piston head 35 in the hole 18, and the engagement between the abutment element 62 and the bevel 42 of the piston slide 40.

For the embodiment according to FIGS. 10–12 the same reference designations are used as for the first embodiment, but with the addition of prime signs. This embodiment differs from the preceding embodiment essentially only in that the bar 4 and the tube 30 with the coupling arrangements thereon have changed place, i.e. the bar 4' is located on the coupling portion 22' and the tube 30' on the attachment portion 2'.

In FIG. 10 the beginning of the interconnection of the coupling portion 22' and the attachment portion 2' is indicated by the arrow 84. The counterparts, not shown, of the piston 34 and the abutment element 62 take the same mutual catching position as in FIG. 7g. From the inserted position in FIG. 11 of the coupling portion 22' rotation according to the arrow 86 to the full interconnecting position shown in FIG. 12 is carried through.

Figure 7I:
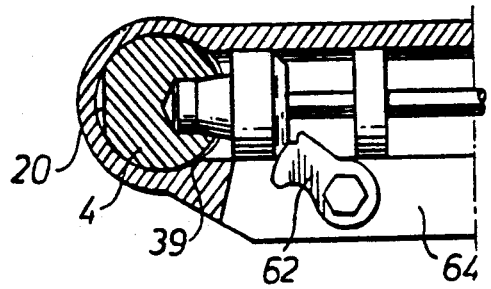

The steps shown in FIGS. 10–12 thus correspond to FIGS. 7g–i.

What is claimed as new and desired to be secured by letters patent of the United States is:

1. A coupling device for being applied on a vehicle, which comprises:
   an attachment portion intended to be attached to and a coupling portion, one of said portions including a tube shaped female element and the other one a longitudinal male element for being received in the female element,
   a movable piston, sidewardly spring biased towards the female element, for being introduced into a side recess in the male element,
   an abutment element for pressing the piston into said side recess in a first mutual position of engagement between the piston and the abutment element, wherein the abutment element sidewardly engages into the path of movement of the piston and is arranged so as to be moved substantially in the longitudinal direction of the piston while moving the piston to a second mutual position of engagement between the abutment element and the piston, in which the abutment element keeps the piston catched, against the action of the spring bias, essentially outside the path of movement of the male element in the female element and wherein the piston and the abutment element are releasable from said second mutual position of engagement by overtravel of the piston and wherein said overtravel is attained by engagement between said male element and the piston upon the introduction of the male element into the female element.

2. A device according to claim 1, wherein the abutment element is spring biased towards the first position of engagement, and wherein the second position of engagement includes a mutual catching of the abutment element and the piston.

3. A device according to claim 1, wherein the abutment element in the first position of engagement acts through a wedgelike engagement with an abutment surface of the piston.

4. A device according to claim 1, wherein the abutment element is carried by a rotatable shaft, extending transversely to the direction of movement of the piston, upon which the spring bias of the abutment element is exerted by a torsion spring.

5. A device according to claim 1, wherein a housing for the abutment element and the piston is arranged on the female element and the female element comprises coupling portion.

* * * * *